United States Patent
Lin et al.

(10) Patent No.: US 9,473,204 B2
(45) Date of Patent: Oct. 18, 2016

(54) FULL-DUPLEX TRANSCEIVER CIRCUIT AND METHOD THEREOF

(71) Applicant: Realtek Semiconductor Corp., Hsinchu (TW)

(72) Inventors: Chia-Liang (Leon) Lin, Fremont, CA (US); Chi-Kung (Richard) Kuan, Taoyuan County (TW)

(73) Assignee: REALTEK SEMICONDUCTOR CORPORATION, Hsinchu (TW)

( * ) Notice: Subject to any disclaimer, the term of this patent is extended or adjusted under 35 U.S.C. 154(b) by 80 days.

(21) Appl. No.: 14/641,515

(22) Filed: Mar. 9, 2015

(65) Prior Publication Data

US 2016/0269076 A1  Sep. 15, 2016

(51) Int. Cl.
  *H04B 3/20* (2006.01)
  *H04L 5/14* (2006.01)

(52) U.S. Cl.
  CPC .. *H04B 3/20* (2013.01); *H04L 5/14* (2013.01)

(58) Field of Classification Search
  CPC ................................ H04B 3/20; H04L 5/14
  See application file for complete search history.

(56) References Cited

U.S. PATENT DOCUMENTS

| | | | | |
|---|---|---|---|---|
| 6,801,621 B1* | 10/2004 | Tennen | ............... | H04L 25/0298 326/30 |
| 2002/0097863 A1* | 7/2002 | Rahamim | ........... | H04L 27/0002 379/399.01 |
| 2003/0142688 A1* | 7/2003 | Chou | ....................... | H04B 3/23 370/420 |
| 2004/0218754 A1* | 11/2004 | Barkaro | ................. | H03H 11/30 379/406.01 |
| 2005/0129224 A1* | 6/2005 | Piket | ..................... | H04M 9/082 379/406.01 |
| 2005/0169163 A1* | 8/2005 | Huang | ..................... | H04B 3/23 370/201 |
| 2005/0185603 A1* | 8/2005 | Huang | ................... | H04B 3/142 370/286 |
| 2006/0222173 A1* | 10/2006 | Lin | ......................... | H04B 3/23 379/406.08 |
| 2009/0175157 A1* | 7/2009 | Huang | ..................... | H04B 3/23 370/201 |
| 2013/0072133 A1* | 3/2013 | Chu | ........................ | H04B 1/38 455/73 |
| 2013/0336494 A1* | 12/2013 | Bathgate | ................ | H03G 9/005 381/66 |
| 2015/0071136 A1* | 3/2015 | Pan | ....................... | H04L 5/1415 370/284 |

* cited by examiner

*Primary Examiner* — Brian D Nguyen
(74) *Attorney, Agent, or Firm* — McClure, Qualey & Rodack, LLP

(57) ABSTRACT

A full-duplex transceiver circuit comprises: a line driver configured to output a first current to a first node and a second current to a second node; a first resistor configured to shunt the first node to ground; a second resistor configured to shunt the second node to ground; a first capacitor configured to couple the first node to a third node; a second capacitor configured to couple the second node to the third node; an operational amplifier configured to receive a first input from a reference node and a second input from the third node and output an output voltage at a fourth node; a feedback network comprising a parallel connection of a third resistor and a third capacitor configured to provide a feedback from the fourth node to the third node; and a transmission line of a characteristic impedance configured to couple the first node to a remote transceiver.

14 Claims, 2 Drawing Sheets

FULL-DUPLEX TRANSCEIVER CIRCUIT AND METHOD THEREOF

BACKGROUND OF THE INVENTION

1. Field of the Invention

The present invention generally relates to full-duplex transceiver circuits and associated methods.

2. Description of Related Art

Persons of ordinary skill in the art understand terms and basic concepts related to microelectronics that are used in this disclosure, such as "voltage," "current," "ground," "resistor," "capacitor," "resistance," "capacitance," "signal," "node," "shunt," "differential," "single-ended" "common mode," "DC (direct current)," "impedance," "impedance matching," "logical signal," "transmission line," "characteristic impedance," "switch," and "operational amplifier." Terms and basic concepts like these are apparent to those of ordinary skill in the art and thus will not be explained in detail here.

If the logical signal is "high" (or "1") it is said to be "asserted." If the logical signal is "low," (or "0") it is said to be "de-asserted."

A full-duplex transceiver is an apparatus configured to concurrently transmit a first signal using a transmitter and receive a second signal using a receiver. In practice, a part of the first signal often leaks into the receiver and combines with the second signal to form a third signal, which is what the receiver actually receives and has to process. The part of the first signal that leaks into the receiver is referred to as an "echo," which is a noise that impairs the receiver and needs to be suppressed. In U.S. Pat. No. 8,045,702, Lin et at teach a hybrid circuit for use in a full-duplex transceiver to reduce the echo. The hybrid circuit, however, is based on differential signaling, wherein both the first signal transmitted by the transmitter and the second signal received by the receiver are differential signals. As widely known in the prior art, a differential signal comprises a first end, also known as a positive end, and a second end, also known as a negative end. In contrast, a single-ended signal comprises only a single end. While differential signaling offers numerous advantages, single-ended signaling is used in many applications thanks to lower complexity.

What are disclosed are method and apparatus of echo reduction for a full-duplex transceiver that utilizes single-ended signaling.

BRIEF SUMMARY OF THIS INVENTION

An objective of embodiments of the present invention is to transmit a first signal and receive a second signal concurrently using a single-ended signaling scheme via a shared transmission medium while preventing the first signal from interfering the receiving of the second signal.

An objective of embodiments of the present invention is to transmit a first signal and receive a second signal concurrently using a single-ended signaling scheme via a shared transmission medium while preventing the first signal from interfering the receiving of the second signal and also maintaining a good power integrity.

An objective embodiments of the present invention is to transmit a first signal and receive a second signal concurrently using a single-ended signaling scheme via a shared transmission medium while preventing the first signal from interfering the receiving of the second signal, maintaining a good power integrity, and allowing a high degree of freedom in determining a DC (direct-current) operation point.

In an embodiment, a full-duplex transceiver circuit comprises: a line driver configured to output a first current to a first node and a second current to a second node; a first resistor configured to shunt the first node to ground; a second resistor configured to shunt the second node to ground; a first capacitor configured to couple the first node to a third node; a second capacitor configured to couple the second node to the third node; an operational amplifier configured to receive a first input from a reference node and a second input from the third node and output an output voltage at a fourth node; a feedback network comprising a parallel connection of a third resistor and a third capacitor configured to provide a feedback from the fourth node to the third node; and a transmission line of a characteristic impedance configured to couple the first node to a remote transceiver.

In an embodiment, the first current and the second current are complementary. In an embodiment, a value of the first resistor is approximately equal to a value of the characteristic impedance. In an embodiment, a value of the second resistor is approximately one half of a value of the first resistor. In an embodiment, a value of the first capacitor is approximately equal to a value of the second capacitor. In an embodiment, a total impedance at the first node is approximately equal to a total impedance at the second node. In an embodiment, the line driver comprises a current source configured to provide a constant current, a first switch configured to swing the constant current to the first node when a logical signal is asserted, and a second switch configured to swing the constant current to the second node when the logical signal is de-asserted.

In an embodiment, a method comprises: outputting a first current to a first node and a second current to a second node; shunting the first node to ground using a first resistor; shunting the second node to ground using a second resistor; coupling the first node to a third node using a first capacitor; coupling the second node to the third node using a second capacitor; coupling a reference node to a first input terminal of an operational amplifier; coupling the third node to a second input terminal of the operational amplifier; coupling an output terminal of the operational amplifier to a fourth node; coupling the fourth node to the third node via a feedback network comprising a parallel connection of a third resistor and a third capacitor; and coupling the first node to a remote transceiver using a transmission line of a characteristic impedance. In an embodiment, the first current and the second current are complementary. In an embodiment, a value of the first resistor is approximately equal to a value of the characteristic impedance. In an embodiment, a value of the second resistor is approximately one half of a value of the first resistor. In an embodiment, a value of the first capacitor is approximately equal to a value of the second capacitor. In an embodiment, a total impedance at the first node is approximately equal to a total impedance at the second node. In an embodiment, "outputting a first current to a first node and a second current to a second node" comprises: swinging a constant current from a current source to the first node when a logical signal is asserted, and swing the constant current from the current source to the second node when the logical signal is de-asserted.

DETAILED DESCRIPTION OF THE DRAWINGS

DETAILED DESCRIPTION OF THIS INVENTION

Embodiments of the present invention relate to full-duplex transceiver circuits. While the specification describes several example embodiments of the invention considered favorable modes of practicing the invention, it should be understood that the invention can be implemented in many ways and is not limited to the particular examples described below or to the particular manner in which any features of such examples are implemented. In other instances, well-known details are not shown or described to avoid obscuring aspects of the invention.

In this disclosure, a logical signal is a signal of two states: "high" and "low," which can also be re-phrased as "1" and "0." For brevity, when a logical signal is in the "high" ("low") state, we can simply state that the logical signal is "high" ("low"), or alternatively, the logical signal is "1" ("0"). Also, for brevity, we sometimes drop the quotation marks, and simply state that the logical signal is high (low), or alternatively, the logical signal is 1 (0), with the understanding that the statement is made in the context of describing a state of the logical signal.

The present invention is described from an engineering viewpoint, wherein a first quantity is said to be "equal to" a second quantity if a difference between the first quantity and the second quantity is smaller than a given tolerance. For instance, 100.2 mV is said to be equal to 100 mV if the given tolerance is 0.5 mV. In other words, when we state: "X is equal to Y," we mean: "X is approximately equal to Y, and a difference between X and Y is smaller than a given tolerance of interest." Likewise, in a mathematical expression, an equal sign "=" means "equal to, from the engineering viewpoint." Likewise, when we state: "X is constant," we mean: "X is approximately constant; when we state: "X is zero," we mean: "X is smaller than a given tolerance of interest and thus negligible."

In this disclosure, a value of a resistor refers to a resistance of the resistor, while a value of a capacitor refers to a capacitance of the capacitor.

Figure 1:
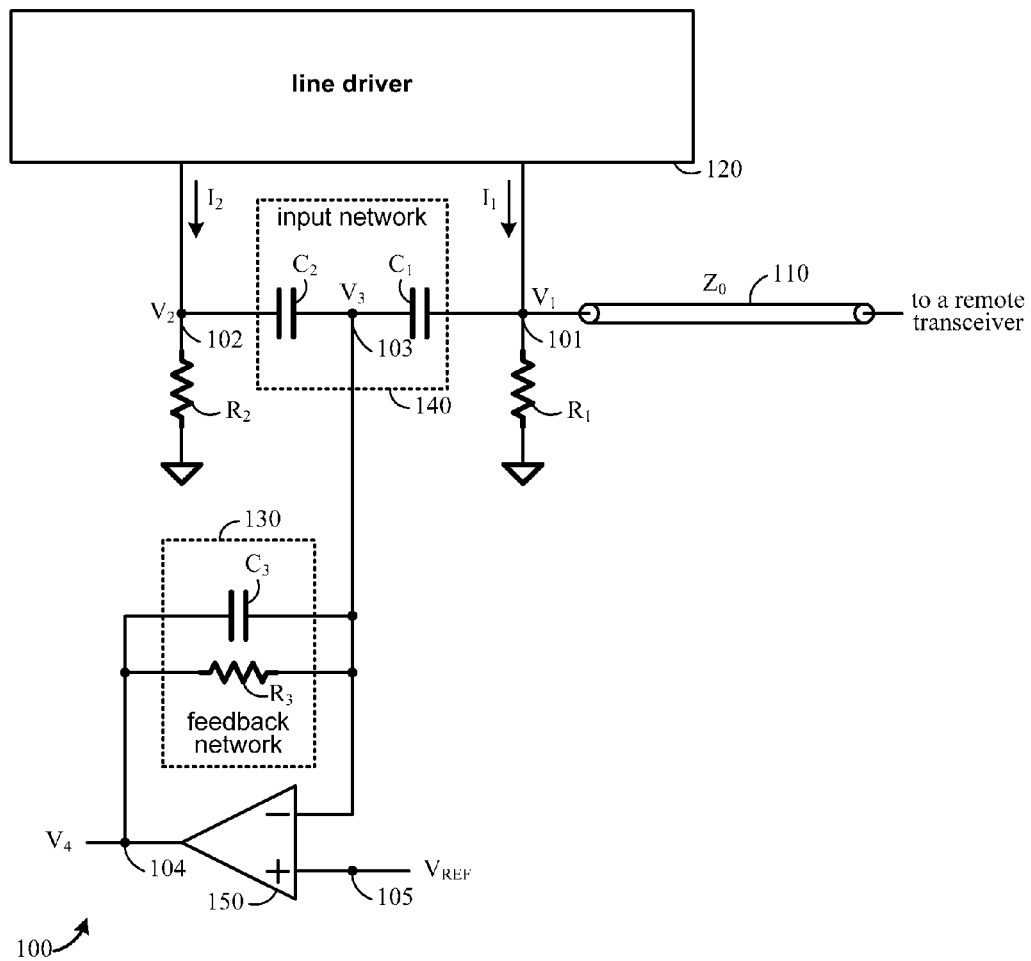
FIG. 1 shows a schematic diagram of a full-duplex transceiver in accordance with an embodiment of the present invention.

FIG. 1 depicts a schematic diagram of a full-duplex transceiver 100 in accordance with an embodiment of the present invention. The full-duplex transceiver 100 comprises: a line driver 120 configured to output a first current $I_1$ and a second current $I_2$ to a first node 101 and a second node 102, respectively, wherein a voltage at the first node 101 and a voltage at the second node 102 are referred to as a first voltage $V_1$ and a second voltage $V_2$, respectively; a first resistor $R_1$ configured to shunt the first node 101 to ground; a second $R_2$ configured to shunt the second node 102 to ground; an input network 140 comprising a first capacitor $C_1$ configured to couple the first node 101 to a third node 103, and a second capacitor $C_2$ configured to couple the second node 102 to the third node 103, wherein a voltage at the third node 103 is referred to as a third voltage $V_3$; an operational amplifier 150 configured to receive a first input (denoted by the "+" sign) from a reference node 105 of a reference voltage $V_{REF}$, which is a DC voltage, and a second input (denoted by the "−" sign) from the third node 103 and output a fourth voltage $V_4$ at a fourth node 104; a feedback network 130 comprising a parallel connection of a third resistor $R_3$ and a third capacitor $C_3$ configured to provide a negative feedback for the operational amplifier 150 from the fourth node 104 to the third node 103; and a transmission line 110 of characteristic impedance $Z_0$ configure to couple the first node 101 to a remote transceiver (not shown in FIG. 1).

The line driver 120 outputs the first current $I_1$ and the second current $I_2$ in a complementary manner, so that a sum of the first current $I_1$ and the second current $I_2$ remains constant. In other words, whenever the first current $I_1$ increases by an amount, the second current $I_1$ must decrease by the same amount, and vice versa.

The first resistor $R_1$ is configured to provide impedance matching at the first node 101. In an embodiment, a value of the first resistor $R_1$ is equal to a value of the characteristic impedance $Z_0$ of the transmission line 110; this effectively fulfills impedance matching at the first node 101.

The second resistor $R_2$ is configured to establish a balanced loading for the line driver 120; by "balanced loading," we mean that a total impedance at the second node 102 is equal to a total impedance at the first node 101, and therefore the first node 101 and the second node 102 are balanced to the line driver 120. In an embodiment, a value of the second resistor $R_2$ is equal to one half of a value of the first resistor $R_1$, and a value of the first capacitor $C_1$ is equal to a value of the second capacitor $C_2$; this effectively fulfills the purpose of balanced loading if the value of the first resistor $R_1$ is equal to the value of the characteristic impedance $Z_0$.

The operational amplifier 150 along with the input network 140 and the feedback network 130 form an inverting amplifier. Those of ordinary skill art understand that, a gain of the inverting amplifier is equal to a ratio between an impedance of the feedback network 130 and an impedance of the input network 140. The impedance of the feedback network 130 is $R_3/(1+sR_3C_3)$. Both the first voltage $V_1$ and the second voltage $V_2$ are an input to the inverting amplifier, and the impedances they see into the input network 140 are $1/sC_1$ and $1/sC_2$, respectively. Therefore, the fourth voltage $V_4$ is a weighted sum of the first voltage $V_1$ and the second voltage $V_2$, and can be expressed by the following equation:

$$V_4(s) = -\left(\frac{sR_3C_1}{1+sR_3C_3}\right)\cdot V_1(s) - \left(\frac{sR_3C_2}{1+sR_3C_3}\right)\cdot V_2(s) \quad (1)$$

Here, the variable "s" denotes a Laplace transform variable that is well known and widely used in the prior art and thus not explained in detail here. When a value of the first capacitor $C_1$ and a value of the second capacitor $C_2$ are the same and equal to a common value $C_1$, we can rewrite Equation (1) as $$V_4(s) = -\left(\frac{sR_3C_I}{1+sR_3C_3}\right)\cdot(V_1(s)+V_2(s)) \quad (2)$$

Due to the full-duplex nature, the first voltage $V_1$ comprises a TX (which denotes transmit) component and a RX (which denotes receive) component. The TX component is determined by the first current $I_1$, while the RX component is determined by a voltage at an output of the remote transceiver. In contrast, the second voltage $V_2$ is nearly solely determined by the second current $I_2$ and is nearly independent of said voltage at said output of the remote transceiver, since the third node 103 is a virtual ground, thanks to operational amplifier 150 configured in the negative feedback topology, and thus provides a good isolation between the first node 101 and the second node 102. Therefore, we can rewrite Equation (2) as $$V_4(s) = -\left(\frac{sR_3C_I}{1+sR_3C_3}\right)\cdot(V_{1TX}(s) + V_{1RX}(s) + V_2(s)) \quad (3)$$

Here, $V_{1TX}$ is the TX component of the first voltage $V_1$ and $V_{1RX}$ is the RX component of the first voltage $V_1$. We can also write $$V_{1TX}(s) = I_1(s)Z_1(s) \quad (4)$$

and $$V_2(s) = I_2(s)Z_2(s) \quad (5)$$

Here, $Z_1$ is the total impedance at the first node 101, and $Z_2$ is the total impedance at the second node 102. As mentioned earlier, the first resistor $R_1$, the second resistor $R_2$, the first capacitor $C_1$, and the second capacitor $C_2$ are configured to provide a balanced loading for the line driver 120, so that $Z_1$ is equal to $Z_2$. Let both $Z_1$ and $Z_2$ be equal to $Z_L$. Then, we can rewrite Equation (3) as $$V_4(s) = -\left(\frac{sR_3C_I}{1+sR_3C_3}\right)\cdot(I_1(s)+I_2(s))\cdot Z_L(s) - \left(\frac{sR_3C_I}{1+sR_3C_3}\right)\cdot V_{1RX}(s) \quad (6)$$

As mentioned earlier, the first current $I_1$ and the second current $I_2$ are complementary, therefore the term $(I_1(s)+I_2(s))$ is a constant, which is zero except at DC. At DC, however, the term $$\left(\frac{sR_3C_I}{1+sR_3C_3}\right)$$

is zero. Therefore, the term $$\left(\frac{sR_3C_I}{1+sR_3C_3}\right)\cdot(I_1(s)+I_2(s))\cdot Z_L(s)$$

is always zero. Therefore, Equation (6) is reduced to $$V_4(s) = -\left(\frac{sR_3C_I}{1+sR_3C_3}\right)\cdot V_{1RX}(s) \quad (7)$$

In other words, the fourth voltage $V_4$ contains only the RX component of the first voltage $V_1$, while the TX component is effectively removed. Full-duplex transceiver 100, therefore, has excellent echo cancellation.

By way of example but not limitation, in an embodiment: $Z_0$ is 50 Ohm; $R_1$ is 50 Ohm; $R_2$ is 25 ohm; $C_1$ is 100 fF; $C_2$ is 100 fF; $C_3$ is 50 fF; and $R_3$ is 1 Mohm.

Implementation of an operational amplifier is well known to those of ordinary skill in the art and thus not described in detail here.

Figure 2:
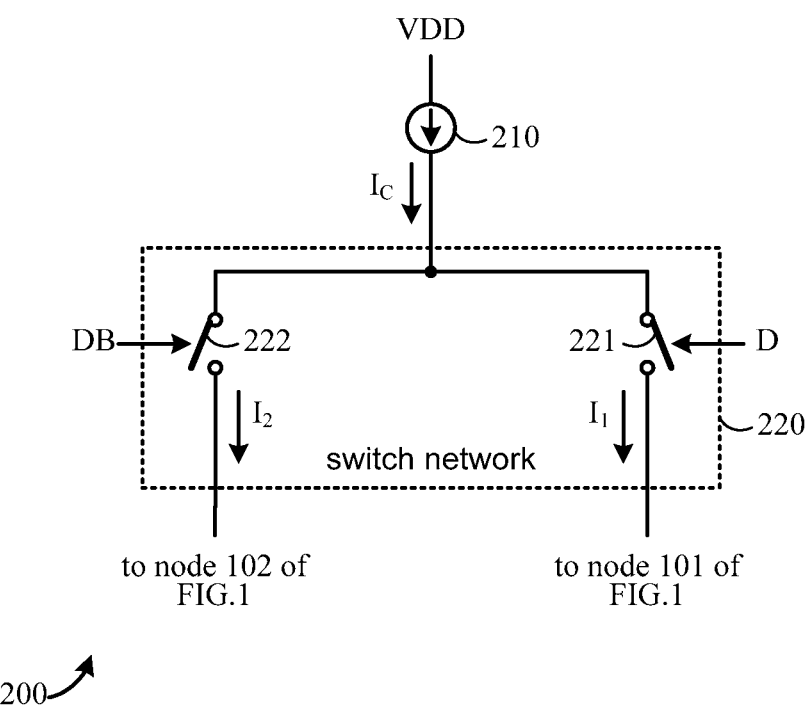
FIG. 2 shows a schematic diagram of a line driver suitable for use in the full-duplex transceiver of FIG. 1.

FIG. 2 depicts a schematic diagram of a line driver 200 suitable for embodying line driver 120 of FIG. 1. Line driver 200 comprises: a current source 210 configured to output a constant current $I_C$; a switch network 220 comprising a first switch 221 and a second switch 222 configured to receive the constant current $I_C$ and output the first current $I_1$ to first node 101 of FIG. 1 and the second current $I_2$ to second node 102 of FIG. 1. Here, "VDD" denotes a power supply node. The first switch 221 is controlled by a logical signal D, and the second switch 222 is controlled by another logical signal DB that is complementary to the logical signal D. When D is 1: DB is 0, the first switch 221 is turned on, the second switch 222 is turned off, the first current $I_1$ is equal to $I_C$, and the second current $I_2$ is zero. When D is 0: DB is 1, the first switch 221 is turned off, the second switch 222 is turned on, the first current $I_1$ is zero, and the second current $I_2$ is equal to $I_C$. Due to the complementary nature, $(I_1+I_2)$ is always equal to $I_C$, regardless of a state of the logical signal D. Therefore, the first current $I_1$ and the second current $I_2$ are complementary. Implementations of current source and switch are well known to those of ordinary skill in the art and thus not described in detail.

Now refer back to FIG. 1. Besides providing excellent echo cancellation, full-duplex transceiver 100 also has other advantages. First, as explained earlier, the line driver 120 sees a balanced load and the total current output from the line driver 120 is constant (since the first current $I_1$ and the second current $I_2$ are complementary). The line driver 120 is powered by a power supply circuit (which is a circuit that establishes a power supply voltage, for instance, at the power supply node VDD shown in FIG. 2). Since the total current output from the line driver 120 is constant, the power that the line driver 120 needs from the power supply circuit is also constant. This is beneficial to the power supply circuit, since it is easier to maintain a stable power supply voltage for a case where the power needed is constant than for an another case where the power needed is ever changing. Therefore, a common problem of poor power integrity associated with single-ended signaling is alleviated. Second, the input network 140 provides capacitive coupling to the operational amplifier 150. This allows the DC value of the fourth voltage $V_4$ to be equal to the reference voltage $V_{REF}$, regardless of the DC value of the first voltage $V_1$ or the second voltage $V_2$. In other words, we can control the DC value of the fourth voltage $V_4$ by setting the reference voltage $V_{REF}$, without needing to consider the DC value of the first voltage $V_1$ or the second voltage $V_2$. This offers a high degree of freedom to circuit designers in determining a DC operation point of the operational amplifier 150.

Those skilled in the art will readily observe that numerous modifications and alterations of the device and method may be made while retaining the teachings of the invention. Accordingly, the above disclosure should be construed as limited only by the metes and bounds of the appended claims.

What is claimed is:

1. A full-duplex transceiver circuit comprising:
   a line driver configured to output a first current to a first node and a second current to a second node;
   a first resistor configured to shunt the first node to ground;
   a second resistor configured to shunt the second node to ground;
   a first capacitor configured to couple the first node to a third node;
   a second capacitor configured to couple the second node to the third node;
   an operational amplifier configured to receive a first input from a reference node and a second input from the third node and output an output voltage at a fourth node;
   a feedback network comprising a parallel connection of a third resistor and a third capacitor configured to provide a feedback from the fourth node to the third node; and
   a transmission line of a characteristic impedance configured to couple the first node to a remote transceiver.

2. The full-duplex transceiver circuit of claim 1, wherein the first current and the second current are complementary.

3. The full-duplex transceiver circuit of claim 2, wherein a value of the first resistor is approximately equal to a value of the characteristic impedance.

4. The full-duplex transceiver circuit of claim 3, wherein a value of the second resistor is approximately one half of a value of the first resistor.

5. The full-duplex transceiver circuit of claim 4, wherein a value of the first capacitor is approximately equal to a value of the second capacitor.

6. The full-duplex transceiver circuit of claim 5, wherein a total impedance at the first node is approximately equal to a total impedance at the second node.

7. The full-duplex transceiver circuit of claim 1, wherein the line driver comprises a current source configured to provide a constant current, a first switch configured to swing the constant current to the first node when a logical signal is asserted, and a second switch configured to swing the constant current to the second node when the logical signal is de-asserted.

8. A method comprising:
outputting a first current to a first node and a second current to a second node;
shunting the first node to ground using a first resistor;
shunting the second node to ground using a second resistor;
coupling the first node to a third node using a first capacitor;
coupling the second node to the third node using a second capacitor;
coupling a reference node to a first input terminal of an operational amplifier;
coupling the third node to a second input terminal of the operational amplifier;
coupling an output terminal of the operational amplifier to a fourth node;
coupling the fourth node to the third node via a feedback network comprising a parallel connection of a third resistor and a third capacitor; and
coupling the first node to a remote transceiver using a transmission line of a characteristic impedance.

9. The method of claim 8, wherein the first current and the second current are complementary.

10. The method of claim 9, wherein a value of the first resistor is approximately equal to a value of the characteristic impedance.

11. The method of claim 10, wherein a value of the second resistor is approximately one half of a value of the first resistor.

12. The method of claim 11, wherein a value of the first capacitor is approximately equal to a value of the second capacitor.

13. The method of claim 12, wherein a total impedance at the first node is approximately equal to a total impedance at the second node.

14. The method of claim 8, wherein the outputting a first current to a first node and a second current to a second node comprises: swinging a constant current from a current source to the first node when a logical signal is asserted, and swing the constant current from the current source to the second node when the logical signal is de-asserted.

* * * * *